United States Patent
Busse

(10) Patent No.: US 6,832,142 B2
(45) Date of Patent: Dec. 14, 2004

(54) ELECTRONIC SYSTEM

(75) Inventor: Gerald Busse, Hildesheim (DE)

(73) Assignee: Volkswagen AG, Wolfsburg (DE)

(*) Notice: Subject to any disclaimer, the term of this patent is extended or adjusted under 35 U.S.C. 154(b) by 0 days.

(21) Appl. No.: 10/181,094

(22) PCT Filed: Dec. 20, 2000

(86) PCT No.: PCT/EP00/13003

§ 371 (c)(1),
(2), (4) Date: Nov. 6, 2002

(87) PCT Pub. No.: WO01/52049

PCT Pub. Date: Jul. 19, 2001

(65) Prior Publication Data

US 2003/0130776 A1 Jul. 10, 2003

(30) Foreign Application Priority Data

Jan. 12, 2000 (DE) .......................... 100 00 922

(51) Int. Cl.⁷ .................... G06F 13/00; B60R 16/02
(52) U.S. Cl. ........................................ 701/36
(58) Field of Search ............................. 701/36, 45, 49; 700/83; 710/100, 104, 105, 113, 240, 241; 345/700, 156

(56) References Cited

U.S. PATENT DOCUMENTS

| 4,442,424 A | 4/1984 | Shirasaki et al. | |
| 5,325,082 A | 6/1994 | Rodriguez | |
| 6,009,355 A | 12/1999 | Obradovich et al. | |
| 6,148,241 A | * 11/2000 | Ludtke et al. | ................ 700/83 |
| 6,266,726 B1 | * 7/2001 | Nixon et al. | ................ 710/105 |
| 6,574,734 B1 | * 6/2003 | Colson et al. | .............. 713/200 |
| 2001/0016789 A1 | * 8/2001 | Staiger | |

FOREIGN PATENT DOCUMENTS

| DE | 196 40 735 | | 4/1998 | |
| DE | 690 06 885 T3 | | 5/1999 | |
| EP | 0 272 877 | | 6/1988 | |
| EP | 0 277 014 | | 8/1988 | |
| EP | 0 392 411 | | 10/1990 | |
| WO | WO 99/08897 | * | 2/1999 | ............ B60Q/1/26 |
| WO | WO 99/35008 | | 7/1999 | |

* cited by examiner

Primary Examiner—Thu V. Nguyen
(74) Attorney, Agent, or Firm—Kenyon & Kenyon

(57) ABSTRACT

An electronic system includes a plurality of electronic components and a central control unit. The electronic components and the central control unit are connected to each other by a bus structure. The central control unit includes a memory. The electric and functional parameters of each electronic component are stored in the memory. Functions may be selected by the central control unit and according to the electric and functional parameters of all of the electronic components. The selection may be displayed for the user by a central graphic interface. The electronic components may be exclusively controlled by the central control unit.

6 Claims, 2 Drawing Sheets

ELECTRONIC SYSTEM

FIELD OF THE INVENTION

The present invention relates to an electronic system, which is made up of a plurality of electronic components.

BACKGROUND INFORMATION

An example of such a system is the comfort and convenience electronics of a motor vehicle, which includes, e.g., an audio-video system, a navigation system, an air conditioner, and other similar components. In this context, the individual components are designed to be autonomous, i.e., fully functional for their respective fields of application alone. To this end, the components are provided with separate input and output units and a separate control unit. Hardware and software are united in a common housing. Because of the limited space in motor vehicles, effort is made in various areas to allow a more efficient design of such systems. First of all, multifunctional control units were developed, which are used as a common input and output unit for a plurality of components. The different components of multifunctional control units have a common, central graphics surface, which is formed by a monitor or an LCD display, touch-screen designs also being conventional. This display unit is assigned a control unit, which interprets the specific inputs and transmits them to the corresponding components or their control units. These multifunctional control units may eliminate the need for separate input and output units, which would otherwise have to be built into the console. In addition, it is conventional that the different components may be interconnected by a bus configuration. In this manner, the different control units can access the data of the other control units and sensors, which means that the multiple acquisition of certain data can be eliminated. The disadvantage of such electrical systems is the lack of ability of an electronic component to access parts of other electrical components, so that many redundant component parts are used, which increase the cost of the electrical system as a whole and occupy a large amount of space. In addition, the interfaces of electrical components belonging to autonomous units are mostly proprietary, so that an exchange of their data is severely limited and synergism of the functions is not possible in most cases. Most of the electronic components may to be replaced when the system is expanded or improved.

Therefore, it is an object of the present invention to provide a flexible electronic system, which may be scaled, is simple and compact, and has improved options for upgrading and functional integration.

SUMMARY

The above and other beneficial objects of the present invention are achieved by providing an electronic system as described herein.

To this end, an example embodiment of an electronic system according to the present invention includes only one central control unit, which is connected to the electronic components by a bus configuration. The central control unit includes a memory device, in which available functions and specific parameters of each electronic component are stored. The central control unit generates a function selection, which may then be displayed via a central graphics interface. This arrangement eliminates the input and output units and the corresponding control units for the individual electronic components. The device-specific data of the electronic components is abstracted or transformed into a format not specific to a device. In this manner, the central control unit may control the existing electronic components and, if necessary, merge their functionality together, so that the number of possible, implementable functions becomes greater than the sum of the individual functions of the electronic components. In addition, this electronic system may allow individual parts of electronic components to be used for functions not specific to a component. Therefore, any multimedia data may be transported and transformed, and functions may be generated from the data, using software engineering alone.

The system may be retrofit in a simple manner, and the system may be easily adaptable to different equipment. In view of the retrofit capability, "plug and play" is implemented by the electronic system. If a new electronic component is integrated into the system, then, in a login procedure, it transmits its parameters to the central control unit, which then saves them in the memory device, so that the central control unit may then use the new function and possibly display it in the graphics interface, if the function software is already configured for these expansion possibilities. In the same manner, different equipment may be produced by simply exchanging the graphics processing software for the graphics interface, given the same hardware set-up and the same function software. The central control unit may take the form of a PC.

In a further example embodiment, the bus configuration may take the form of an MOST bus (media oriented systems transfer). The electronic system may communicate with components of the comfort and convenience electronics in a motor vehicle, using gateways. In this context, the communication with the safety-related components, which may be connected by a CAN bus, may occur via CAN gateways, the communication with other networks such as mobile radio networks taking place via a wireless gateway.

The wireless gateway may have a modular configuration, i.e., the wireless gateway is configured to have several interfaces for possible, connectible transmitting/receiving units for communicating with external networks.

The electronic system may be integrated in a motor vehicle for the comfort and convenience electronics. In principle, the components of the drive unit, such as the transmission control unit, may also be integrated, but this may increase the requirements regarding the functional reliability of the CAN gateway and the control units in question.

The present invention is described below on the basis of an example embodiment.

DETAILED DESCRIPTION

Figure 1:
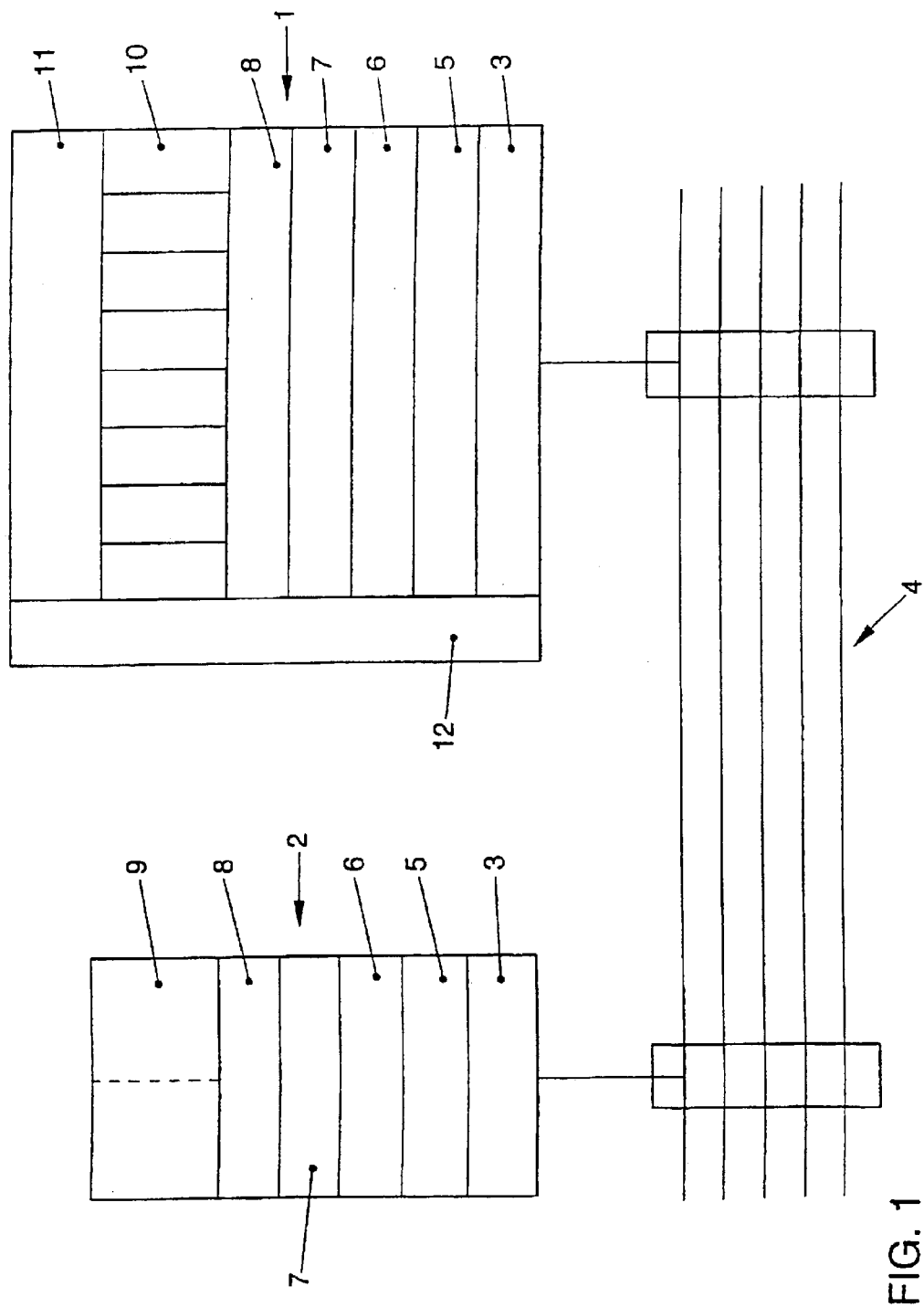
FIG. 1 illustrates a schematic layer model of an electronic system according to the present invention.

FIG. 1 illustrates a schematic layer model of an electronic system according to the present invention. The electronic system includes a central control unit 1 and a plurality of electronic components 2, although only one is illustrated in order to retain an overview. The lowest level 3 of central control unit 1 and electronic components 2 represents the actual hardware, which is physically interconnected by a bus configuration 4. In this context, bus configuration 4 may take the form of an MOST bus. The next higher level 5 is formed by the device-specific driver software. Arranged above this is level 6, which is formed by the operating system. Levels 3, 5, and 6 represent the device-specific levels. An abstraction level 7 is arranged above the operating system. On this level, which is hierarchically superordinate to the operating system, device-specific electronic component 2 and central control unit 1 are abstractly defined in a device-nonspecific manner, using software. A command-interpretation level or demand-interpretation level 8, which is also not specific to a device, is arranged above abstraction level 7. Top level 9 of electronic component 2 contains a function and parameter list of electronic components 2. In the case of retrofitting or initialization of a component 2, the contents of the two lists are transmitted to a memory device 12 of control unit 1. The function software modules 10 in central control unit 1 assume arbitrary functions, such as address book, navigation, diagnostic, entertainment, etc. Therefore, existing device functions are mapped in software. Arranged above this function level 10 is user graphics interface 11, which may be further subdivided in a user-specific and service-specific manner. Prior to actual operation, each electronic component 2 transmits its function and parameter list via bus configuration 4 to central control unit 1, which stores all function and parameter lists in a memory device 12. Put simply, electronic components 2 inform central control unit 1 about what they are and what they may do. Central control unit 1 compiles the possible functions for the user from this information, in which case new, integrated functions may be generated by merging individual functions. For example, the address book may be combined with the navigation, whereby destination entries for the navigation may be taken directly from the address book. In addition, existing components may be used for different functions. Thus, e.g., the same CD playing device may be used to play a CD-ROM having navigation data, or a music CD-ROM. To this end, the playback device, which may take the form of a DVD changer, signals to central control unit 1 that it may read both audio and navigation DVD's. In addition, the DVD changer indicates which DVD is located in which slot of the changer. If data from a navigation DVD may then be read, then central control unit 1 informs the DVD changer, that it may read the DVD in the corresponding slot. The DVD changer recognizes the appropriate DVD and automatically sets the corresponding parameters.

With the aid of the graphics interface, the user inputs a command via an input unit, in order to perform a function. This command is transmitted via bus configuration 4 to central control unit 1. In central control unit 1, this command is assigned a function not specific to a device. Control unit 1 compiles the parts of the components that are required for the function, as well as how these parts may be controlled. This operation occurs in command-interpretation level and demand-interpretation level 8. The control commands not specific to a device are then converted to device-specific control commands for the electronic components 2 to be controlled, and the commands are transmitted to the electronic components via bus configuration 4. The exchange of data and information between electronic components 2 is also accomplished by central control unit 1. To this end, central control unit 1 receives the device-specific data of an electronic component 2, abstracts these data into a data format not specific to a device, converts these data to a device-specific data format of the electronic component 2 meant for reception, and transmits these device-specific data via bus configuration 4 to electronic component 2.

Another considerable advantage of the electronic system may be that retrofitting it with new or improved electronic components may not effect the other electronic components. To this end, only the software in central control unit 1 may have to be modified, since even functionally interacting, electronic components 2 are decoupled with respect to hardware and only communicate with each other through central control unit 1.

Figure 2:
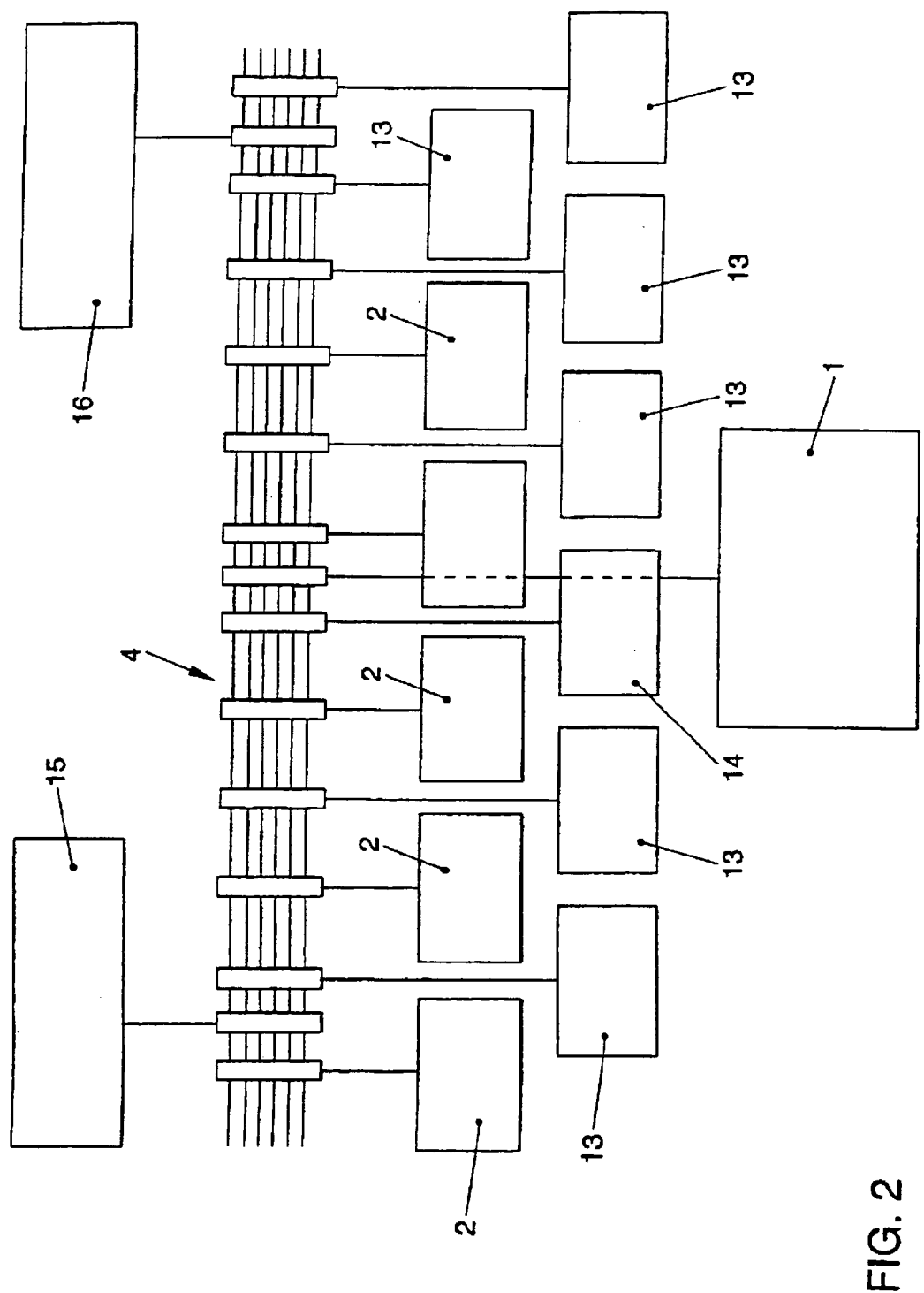
FIG. 2 is a schematic view of the hardware set-up of an electronic system according to the present invention.

The simplified hardware layout of the electrical system is illustrated in FIG. 2. Bus configuration 4 is connected to a multitude of multifunctional input and output units 13, and to electronic components 2. In this context, input and output units 13 may take the form of a touch screen, tip switch, switch, keyboard, microphone, loudspeaker, instrument cluster 14, etc. Examples of electronic components 2 include CD-ROM reader units, radios, cassette recorders, etc. Central control unit 1 is also connected to bus configuration 4. As described above, the electronic components 2 may include just comfort and convenience components. Input and output units 13, the instrument cluster, and electronic components 2 are all treated equally by the system architecture.

When the electronic system is used in a motor vehicle, it may be desirable for data to also be exchanged with other comfort and convenience components or drive components. In this case, the components in a motor vehicle may be interconnected by a CAN bus. This CAN bus may also be further subdivided into a comfort and convenience CAN for the comfort and convenience components, and a drive CAN for the drive components, the two CAN buses then being interconnected by a gateway. In the same manner, bus configuration 4 may be connected to the CAN bus by a CAN gateway 15 and thus receive data from safety-related control units and sensors. In particular, due to safety-engineering aspects, CAN gateway 15 may ensure that unauthorized access to certain control units connected to the CAN bus may not occur. Thus, it may be ensured that, e.g., the transmission control unit may not be manipulated through CAN gateway 15. The communication with other external networks occurs via a wireless gateway 16. Wireless gateway 16 may have a modular construction and may be designed to have interfaces for all conceivable receivers. For example, the wireless gateway is configured to have suitable interfaces for AM/FM receivers, TV/DVBT receivers, GPS, GSM, other radio-communication systems, etc. Depending on the equipment of the motor vehicle, the corresponding receivers and, in some instances, transmitters are connected to wireless gateway 16. In this context, the adaptation to various external devices is likewise carried out at wireless gateway 16, by using software only. An advantage of this architecture may be that wireless gateway 16 therefore transmits the already demodulated data to bus configuration 4. Thus, the electronic system is decoupled from the receiver side, and technical modifications such as data-transmission formats, transmitting frequencies, etc. have no influence on the electronic system. An adaptation may only be performed in accordance with the wireless gateway.

In a further example embodiment, the user graphics interface is also subdivided and abstracted, using software engineering. Standard functional software, over which a variable graphics-processing software is situated, exists for this purpose. This shall be explained by way of example. Navigation data are transmitted in different ways, depending on the equipment of a motor vehicle or the type of motor vehicle. For example, this may be dependent on the different sizes of the display units at hand. The separation of function software and processing software now allows the same function software to be used in all motor vehicles. This function software yields a result in a specific output format. The runtime software positioned above it is vehicle-specific and properly adapted to the desired display. If the user wishes to modify the display of the navigation data, then only the processing software may be replaced. Therefore, a multitude of outwardly different systems may be produced with a minimum of expenditure.

What is claimed is:

1. An electronic system, comprising:
    a plurality of electronic components;
    a central control unit including a memory device configured to store electrical and functional parameters of each electronic component, the central control unit configured to generate a functional selection as a function of the electrical and functional parameters of all of the electronic components;
    a central graphics interface configured to display the functional selection; and
    a bus configuration, the electronic components and the central control unit interconnected by the bus configuration;
    wherein the central control unit and each electrical component is assigned an abstraction level, in which the central control unit and the electrical components are mapped in a data format not specific to a device; and
    wherein the central control unit is configured to assign a function of the functional selection to a command input via the central graphics interface, which is not specific to a device and to combine the electrical components necessary for the command, including control commands not specific to a device, the central control unit configured to convert the control commands to device-specific control commands and to transmit the control commands via the bus configuration to the specific electrical components.

2. The electronic system according to claim 1, wherein the central control unit includes a PC.

3. The electronic system according to claim 1, wherein at least one of the central control unit and the electronic components includes an initialization program configured one of to retrieve by the central control unit and to transmit to the central control unit the electrical and functional parameters of the electronic components prior to start-up.

4. The electronic system according to claim 1, wherein the bus configuration includes a MOST bus.

5. The electronic system according to claim 1, further comprising a gateway configured to communication with at least one of other networks and bus configurations, the bus configuration connected to the gateway.

6. The electronic system according to claim 1, wherein the electronic system includes at least one of an information and an entertainment system in a motor vehicle.

* * * * *